| (12) | United States Patent | (10) Patent No.: | US 8,460,621 B2 |
|---|---|---|---|
| | Schryver et al. | (45) Date of Patent: | *Jun. 11, 2013 |

(54) TEMPERATURE TRANSFER STAND

(75) Inventors: Brian Schryver, Redwood City, CA (US); Jeffrey E. Schryver, Austin, TX (US)

(73) Assignee: Biocision, LLC, Mill Valley, CA (US)

( * ) Notice: Subject to any disclaimer, the term of this patent is extended or adjusted under 35 U.S.C. 154(b) by 581 days.

This patent is subject to a terminal disclaimer.

(21) Appl. No.: 12/349,525

(22) Filed: Jan. 7, 2009

(65) Prior Publication Data

US 2009/0173472 A1   Jul. 9, 2009

Related U.S. Application Data

(60) Provisional application No. 61/019,634, filed on Jan. 8, 2008, provisional application No. 60/980,167, filed on Oct. 15, 2007.

(51) Int. Cl.
    *B01L 9/00*   (2006.01)
(52) U.S. Cl.
    USPC ............ 422/560; 422/561; 422/563; 422/566
(58) Field of Classification Search
    USPC .................. 422/64, 99, 102, 104; 436/47, 48, 436/157; 435/288.4, 303.1, 305.2, 305.3; 219/428, 429

See application file for complete search history.

(56) References Cited

U.S. PATENT DOCUMENTS

| 5,475,610 | A | * | 12/1995 | Atwood et al. | ............... 700/269 |
| 5,616,301 | A | * | 4/1997 | Moser et al. | ................... 422/104 |
| 6,197,572 | B1 | * | 3/2001 | Schneebeli | ................ 435/286.2 |
| 6,657,169 | B2 | * | 12/2003 | Brown | ........................... 219/476 |
| 6,767,512 | B1 | * | 7/2004 | Lurz et al. | ...................... 422/104 |
| 6,906,292 | B2 | * | 6/2005 | Weinfield et al. | ............. 219/428 |
| 7,799,283 | B2 | * | 9/2010 | Jacobs et al. | ................... 422/102 |
| 2005/0145273 | A1 | * | 7/2005 | Atwood et al. | ............... 136/201 |

\* cited by examiner

*Primary Examiner* — Jill Warden
*Assistant Examiner* — Dwayne K Handy
(74) *Attorney, Agent, or Firm* — David R. Conklin; Kirton McConkie

(57) ABSTRACT

A portable temperature transfer stand for holding thermo-conductive laboratory devices transferring thermal energy to laboratory devices is provided as well as its methods of use. The temperature transfer stand comprises at least one supporting structure (foot) and a stable stage, both comprising a thermal conductive material. The supporting structure is in direct contact with the stage which is in direct contact with a laboratory device.

10 Claims, 2 Drawing Sheets

TEMPERATURE TRANSFER STAND

CROSS-REFERENCE TO RELATED APPLICATIONS

This application claims the priority benefit of U.S. Provisional Application No. 61/019,634, filed Jan. 8, 2008, U.S. patent application Ser. No. 12/252,333, filed Oct. 15, 2008, which claims the priority benefit of U.S. Provisional Patent Application No. 60/980,167, filed Oct. 15, 2007, and U.S. patent application Ser. No. 12/130,710, filed May 30, 2008, which claims the priority benefit of U.S. Provisional Patent Application No. 60/980,167, filed Oct. 15, 2007, each of which is incorporated herein by reference in its their entirety.

FIELD OF THE INVENTION

The invention relates to a temperature conductive stand and methods for using the same. In particular, some aspects of the temperature stand are adapted to be used with various thermo-conductive laboratory devices, such as laboratory tubes, laboratory plates in conjunction with thermo-conductive adaptor blocks (such as a portable temperature transfer devices) or laboratory plates.

BACKGROUND OF THE INVENTION

Numerous biotechnical laboratory procedures involve temperature sensitive materials such as enzymes, antibodies, proteins, nucleic acids and chemical reagents typically require the maintenance of proper conditions such as temperature and humidity. In the research laboratory, liquid and solid reagents and biological specimens (hereinafter simply "materials or fluids") are frequently contained within a variety of laboratory tubes and plates in conjunction with thermo-conductive adaptor blocks (such as a portable temperature transfer devices). Common methods for experimental temperature control include the use of ice and regulated water baths. One form of a device consist of thermally conductive material which can then be placed in contact with a thermal source such as ice or water.

While direct contact with ice or water is a useful means of controlling the temperature of tubes in a thermally conductive tube rack or laboratory plates in conjunction with thermo-conductive adaptor blocks (such as a portable temperature transfer devices), there are difficulties associated with doing so. For example, as ice melts, the device on top of the ice may become unstable and might warm changing the temperature of the materials or fluids. With prolonged contact, the melting ice, if not drained, will form a slurry into which the device can become submerged. In water baths, the necessary semi-submersion of the device to achieve thermal contact may subject the tubes or plates to splashing or dispersion due to water bath turbulence.

Therefore, there is a need for a thermally conductive stand on which laboratory devices can be stably placed without the fear of submersion and/or temperature change. The conductive stand will be in contact with a thermal medium such as ice or water. Devices can be placed upon the thermally conductive stand and thereby be in thermal equilibrium with the thermal regulatory medium such as ice or water and benefit from the physical stability provided by the conductive stand.

SUMMARY OF THE INVENTION

Some aspects of the invention provide a method for controlling the temperature of a laboratory device using a portable temperature transfer device. The portable temperature transfer device typically comprises a base and a stage that is adapted to allow placement of a laboratory device. The portable temperature transfer device comprises a thermo conductive material to allow rapid transfer of thermal energy between the temperature control device and the laboratory device.

Other aspects of the invention provide a portable temperature transfer stand comprising:
a base that is adapted to be operatively and removably connected to a temperature control device and comprising a thermo-conductive material that is adapted to rapidly transfer thermal energy to and from the temperature control device; and
a stage located on top of said base and comprises at least a first surface that is adapted to be in contact with a vessel whose temperature is to be controlled, wherein said stage comprises a thermo-conductive material adapted for rapidly transferring thermal energy from the temperature control device to the vessel.

In some embodiments the base is substantially cylindrically shaped or tubular.

Yet in other embodiments, the stage is substantially circular and comprises a plurality of holes for placing and holding one or more vessels within the stage. In some instances, at least a portion of the plurality of holes is tapered such that they are conically shaped. A conically shaped hole allows ease of placing the vessel into the stage. In some instances, the stage comprises a variety of hole sizes to allow accommodation of various vessel sizes.

Still in other embodiments, the stage further comprises a grip handle or one or more holes to allow ease of placing the portable temperature transfer device to and from a temperature control device.

Other aspects of the invention provide apparatuses comprising the portable temperature transfer device and methods for using the same.

DETAILED DESCRIPTION OF THE INVENTION

Figure 1A:
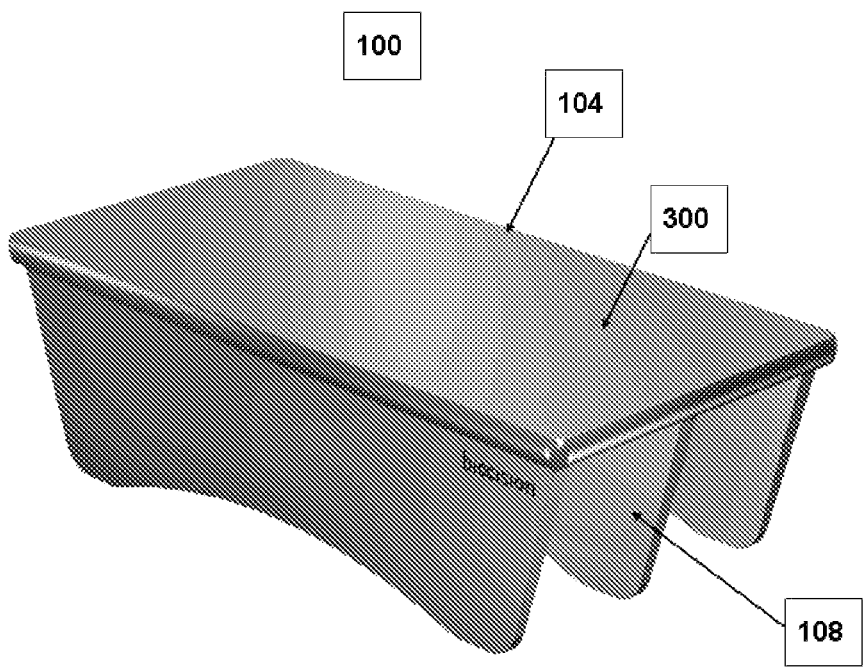
FIG. 1A is a schematic drawing of one particular embodiment of the portable temperature transfer device of the invention.

Numerous biotechnical laboratory procedures involve temperature sensitive materials such as enzymes, antibodies, proteins, nucleic acids and chemical reagents. A common method of working with temperature sensitive materials on a laboratory bench involves filling a thermally insulating bucket or pan with crushed ice and inserting the reagent or experimental containers into the crushed ice to maintain the temperature close to 4 degrees centigrade. While the method is effective at temperature control for short periods of time, numerous problems are associated with using crushed ice as a thermal regulator. The most common complaints include a gradual melting of the ice which allows tubes to tip and eventually sink into ice water slush. Another problem is that crushed ice provides no mechanical resistance to mechanical force so that closing tubes by finger pressure can lead to collapse of the surrounding ice. A third problem is that the ice structure weakens quickly which greatly reduces the useful time for working in crushed ice, and the ice needs to be replenished at frequent intervals of approximately 2 hours. A fourth problem is that when working with flat surface containers such as laboratory plates, the ice will melt unevenly and make the maintenance of a level surface very difficult.

Devices and apparatuses of the present invention solve all of the above problems. It comprises a stage comprising a thermo-conductive material and a base, e.g., one or more legs constructed from a thermo-conductive material. The devices of the invention can be inserted into cube or crushed ice until the base reach the bottom of the ice pan or bucket. The devices of the invention quickly drop in temperature until it equilibrates with the temperature of the ice or any other temperature set by the temperature control device. The portable temperature transfer device is then used as a cold stage on which to place items (e.g., a laboratory device) to be maintained at the desired temperature (e.g., melting ice temperature). Devices of the invention provide the structural integrity regardless of the temperature control device. If ice-water is used as temperature control device, melting of the ice is of no concern and in fact, the thermal conductivity of the ice upon reaching the slush state is more efficient than that obtained with the solid crushed ice state. This property means that using devices of the present invention, the ice will not need to be replenished until it is almost completely melted. A recent test showed that an aluminum block resting on the device of the invention in a laboratory pan of cube ice maintained a temperature below 4° C. for over 10 hours. In addition, by not using the ice for structural stability, devices of the invention provide an extremely strong, stable and level surface on which to work, e.g., tubes can be closed with any human-generated force without fear of collapse.

Devices of the invention can also be configured with recesses on its top or stage surface for allowing various plates to contact the surface on the bottom of the wells to provide a stable base. Devices of the invention can also be configured with a hole for accepting thermometric probes to monitor the tray temperature. Devices of the invention can also be configured with through holes in the stage for accepting and holding tubes, instruments, flasks, or any object which may require warming or cooling by contact with a device of the invention, or that requires holding, stabilizing or positioning. The stage may also be configured with through-holes for the purpose of aiding in lifting or transporting. Devices of this invention can be configured with a tubular or curved base or configured with a disc-shaped stage for use with round buckets or containers.

The present invention will be described with regard to the accompanying drawings which assist in illustrating various features of the invention. In this regard, the present invention generally relates to temperature transfer stand. That is, the invention relates to portable temperature transfer stand for use with devices.

Figure 1B:
FIG. 1B is an illustration showing an aluminum tube block on top of the portable temperature transfer device of the invention.
Figure 2:
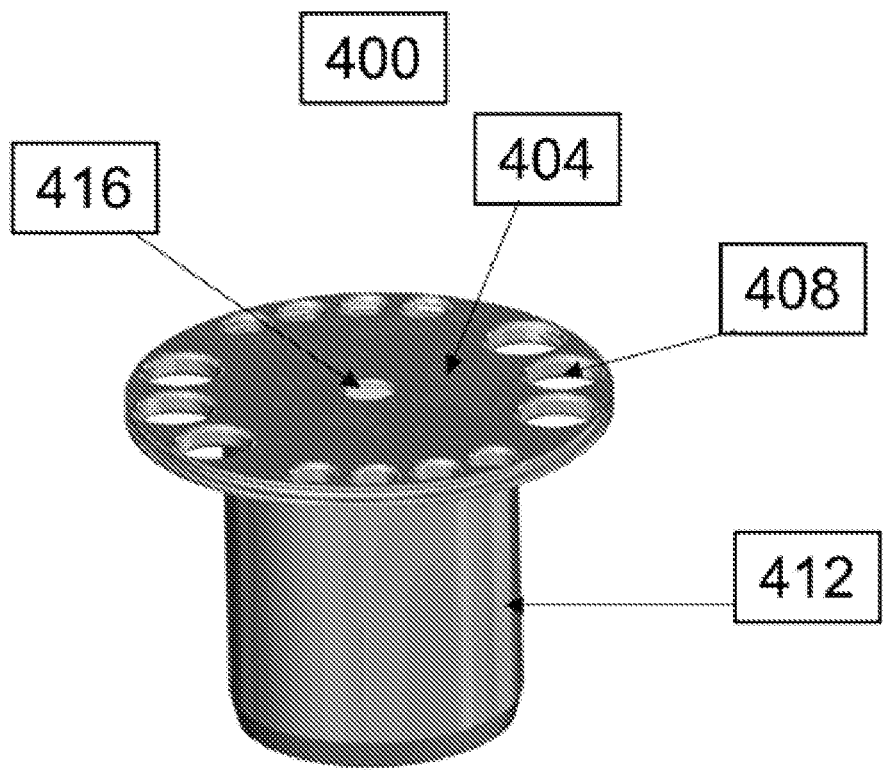
FIG. 2 is an illustration of another particular embodiment of a portable temperature transfer device of the invention.

Some of the features of the temperature transfer stand of the invention are generally illustrated in FIGS. 1 and 2, which are provided for the purpose of illustrating the practice of the invention and which do not constitute limitations on the scope thereof.

As used herein, the terms "laboratory devices" and "devices" are generally used interchangeably, unless the context requires otherwise, to refer to various commercially available tube or plate holders that are adapted for use in holding laboratory plates or tubes as well as any other laboratory devices that are used in various experiments under different temperature conditions. Thermo-conductive or non-thermo-conductive laboratory devices, such as aluminum laboratory tube holders or non-conductive laboratory plates are commercially readily available from various sources including Fisher Scientific, Sigma, Aldrich, as well as other laboratory equipment suppliers.

Referring to FIG. 1, the temperature transfer stand 100 generally comprises a base 104 which can be include one or more legs 108 and a stage 300. The leg(s) 108 can be an extruded portion of base 104 or it can be a separate add-on to base 104.

Figure 3:
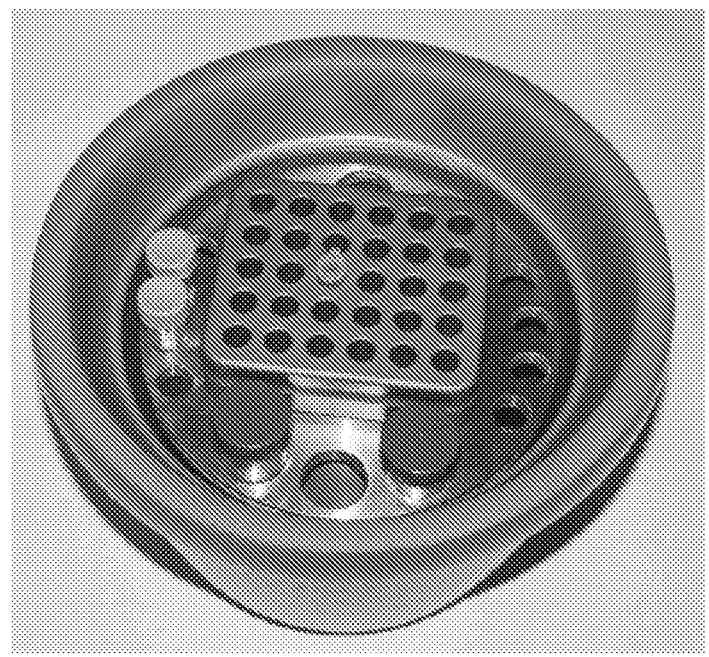
FIG. 3 is an image showing an aluminum tube block on top of the device illustrated in FIG. 2.

Referring to FIG. 2, the temperature stand can be constructed a circular configuration 400 for use with circular buckets or containers, and which may include a disc-shaped stage 404 that may have recesses or through-holes 408 for the purpose of retaining containers, tubes, instruments or objects. The stage can also contain through-holes 416 to facilitate carrying or transport. The base can comprise a tubular configuration 412 and may contain a number of recesses or passageways to allow the free passage of gas and fluids between the inner volume of the base and the exterior of the base (not shown). An example of the construction and use of the device in FIG. 2 is shown in FIG. 3. In this image, the stage is occupied by a thermo-conductive tube rack, while a portion of the through-holes are occupied by sample tubes. The device is contained in a circular foam rubber bucket.

The material from which the temperature transfer stand is constructed allows rapid heat exchange so that the desired temperature range can be quickly established by contact with a thermal mass such as ice, dry ice, liquid nitrogen or any other cooling device, a water bath or a hot plate or any other heating device. The thermo-conductive stand has an added advantage of preventing sinking of the laboratory device during its use, e.g., the laboratory process.

In some embodiments, the stage 300 can comprise at least one concavity (not shown) such that a laboratory device sits within the concavity (not shown). Generally, the depth of concavity is such that at least a portion of the side-walls of the laboratory device fits within the concavity. As can be appreciated, the more surface area contact between device and the stage 300 via its concavity (not shown) will lead to faster heat transfer.

The stage 300 is comprised of a thermo-conductive material such as aluminum, aluminum alloy, copper, copper alloy, and other materials (both metal and non-metal) that are known to be good thermo-conductors.

In some embodiments, the temperature transfer stand 100 is operatively connected, to a temperature control device (not shown). The temperature control device can comprise a coil (not shown) that cools or heats the stand. Such coil can be placed on the bottom surface of stage 300, i.e., underneath stage 300 such that the coil does not come in direct contact with the laboratory device. Any temperature control coils that can heat or cool, which are well known in the art, can be used as long as the temperature of the coil can be transferred to stage 300.

The temperature control device can also comprise a temperature control system, timer control system, or a combination thereof. Such systems allow one to set the desired temperature and/or time to allow automated operation. In some instances, a central processing unit (e.g., a computer) can be used as the control system(s). Both the temperature control system and timer control system are well known in the art and can be configured to be used with the temperature control stand.

In some embodiments, the temperature control device is an ice-bath, ice, dry ice, liquid nitrogen, or other cold solids or liquids. Often these non-electronic temperature control devices are placed underneath the temperature transfer device 100 such that any moisture it creates is contained within the environment enclosed by the base 104. In this manner, temperature transfer device 100 prevents or substantially reduces any undesired humidity from reaching the individual wells of laboratory culture plates.

Utility

Temperature transfer device of the invention can be used for any application in which it is desired to rapidly cool or warm the contents (e.g. fluids containing enzymes, antibodies, proteins, nucleic acids and chemical reagents) of laboratory tubes or plates or any laboratory device and substantially maintain the temperature for extended periods of time. The temperature transfer device can be used in applications that depend upon temperature stabilization of, or rapid heat transfer to or from any thermo-conductive laboratory devices.

Devices of the invention can also be used for the purpose of freezing, thawing, cooling or warming of biological specimens, for example for the solid matrix embedment of tissues for the purpose of histological preservation or processing. Devices of the invention can also be used for thermal management of chemical reactions or processes, for warming and cooling during In Vivo experimentation or surgical procedures, for botanical procedures and specimens, for photographic procedures and electronic component and assembly testing. The temperature transfer device can also be used for non-laboratory applications such as culinary processes or food temperature management, for example the cooling of baked goods, dough, meats and candies.

As an example, assays using enzymes, antibodies, proteins, nucleic acids and chemical reagents depend on rapid cooling or heating. In this particular application, the temperature transfer stand is cooled to a desired temperature and the laboratory tube holder is placed on top of the stand.

Typically, the temperature transfer stand of the invention is placed on ice, dry ice, liquid nitrogen or any heating or cooling device until the temperature of the temperature transfer device has reached the approximate temperature of the cooling or heating medium. The temperature transfer device can be left in contact with the cooling or heating medium or placed on a thermally insulating surface such as plastic foam board or rubber mat. The bottom of the laboratory device is then placed in contact with the stable stage of the stand. The laboratory device is rapidly cooled or warmed and held at equilibrium temperature for extended periods of time.

An experiment with a prototype at room temperature showed that an aluminum block resting on the temperature transfer stand in a laboratory pan of ice maintained a temperature below 4° C. for over 10 hours without the addition of fresh ice.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A portable temperature transfer stand consisting essentially of
   a monolithic device having a first leg, a second leg, a third leg, and a top plate having a top surface and a bottom surface in a first plane, the first leg being coupled to a proximal edge of the bottom surface of the top plate such that a planar surface of the first leg is oriented in a second plane that is substantially perpendicular to the first plane, the second leg being coupled to a distal edge of the bottom surface of the top plate such that a planar surface of the second leg is substantially oriented in a third plane that is parallel to the second plane, and the third leg being coupled to the bottom surface of the top plate at a position between the proximal and distal edges of the bottom surface of the top plate, a planar surface of the third leg being substantially oriented in a fourth plane that is parallel to the second and third plane, the top surface being configured to support a laboratory device, wherein the monolithic device includes a thermo-conductive material selected from the group consisting of aluminum, copper, aluminum alloy, copper alloy, and combinations thereof, the thermo-conductive material being capable of rapidly transferring thermal energy to and from a temperature control material to the laboratory device, and wherein the top plate is rectangular-shaped, and wherein each leg of the monolithic device is plate-shaped and oriented perpendicular to and along a long-axis of the rectangular-shaped top plate.

2. The portable temperature transfer stand of claim 1, wherein said monolithic device is produced by extrusion of a thermoconductive metal.

3. The portable temperature transfer stand of claim 1, wherein each leg of the monolithic device includes an arched middle that extends between a first end and a second end of each leg.

4. A portable temperature stand consisting essentially of: a monolithic device having a first leg, a second leg, a third leg, and a top plate having a top surface and a bottom surface in a first plane, the first leg being coupled to a proximal edge of the bottom surface of top plate such that a planar surface of the first leg is oriented in a second plane that is substantially perpendicular to the first plane, the second leg being coupled to a distal edge of the bottom surface of the stage plate such that a planar surface of the second leg is substantially oriented in a third plane that is parallel to the second plane, and the third leg being coupled to the bottom surface of the top plate at a position between the proximal and distal edges of the stage bottom surface of the top plate, a planar surface of the third leg being substantially oriented in a fourth plane that is parallel to the second and third plane, the top surface being configured to support a laboratory device, wherein the monolithic device consists essentially of a thermo-conductive material selected from the group consisting of aluminum, copper, aluminum alloy, copper alloy, and combinations thereof, the thermo-conductive material being capable of rapidly transferring thermal energy to and from a temperature control material to the laboratory device, wherein the top plate is rectangular shaped, wherein each leg of the monolithic device is plate shaped and oriented perpendicular to and along a long axis of the rectangular shaped top plate, and, wherein said top plate includes a grip handle.

5. A method for adjusting thermal energy of a sample contained in a laboratory device, said method comprising placing a laboratory device containing the sample on a portable temperature transfer stand that is removably placed in a container comprising a temperature control material selected from the group consisting of ice, ice and water, and liquid nitrogen, and maintaining contact between the portable temperature transfer stand and the temperature control material in the container for a period of time sufficient to adjust thermal energy of the sample to a substantially desired amount, wherein the portable temperature transfer stand is a monolithic device consisting essentially of a first leg, a second leg, a third leg, and a top plate having a top surface and a bottom surface in a first plane, the first leg being coupled to a proximal edge of the bottom surface of the stage top plate such that a planar surface of the first leg is oriented in a second plane that is substantially perpendicular to the first plane, the second leg being coupled to a distal edge of the bottom surface of the top plate such that a planar surface of the second leg is substantially oriented in a third plane that is parallel to the second plane, and the third leg being coupled to the bottom surface of the top plate at a position between the proximal and distal edges of the bottom surface of the top plate, a planar surface of the third leg being substantially oriented in a fourth plane that is parallel to the second and third plane, the top surface being configured to support the laboratory device, wherein the monolithic device comprises a thermo-conductive material that is capable of rapidly transferring thermal energy to and from the temperature control material and the laboratory device, and wherein the top plate is rectangular-shaped, and wherein each leg of the monolithic device is plate-shaped and oriented perpendicular to and along a long-axis of the rectangular-shaped top plate.

6. The method of claim 5, wherein the portable temperature transfer stand is produced by extrusion of thermoconductive metal.

7. The method of claim 5, wherein the thermo-conductive material of the monolithic device comprises a metal.

8. The method of claim 7, wherein said metal comprises aluminum, copper, aluminum alloy, copper alloy, or a combination thereof.

9. The method of claim 5, wherein the top surface is configured to prevent any significant lateral movement of the laboratory device when the laboratory device is placed on the top surface.

10. The method of claim 5, wherein each leg of the monolithic device comprises an arched middle that extends between a first end and a second end of each leg.

* * * * *